(No Model.)
J. A. SEELY.
LEADING-IN APPARATUS FOR CONDUITS.
No. 400,958. Patented Apr. 9, 1889.
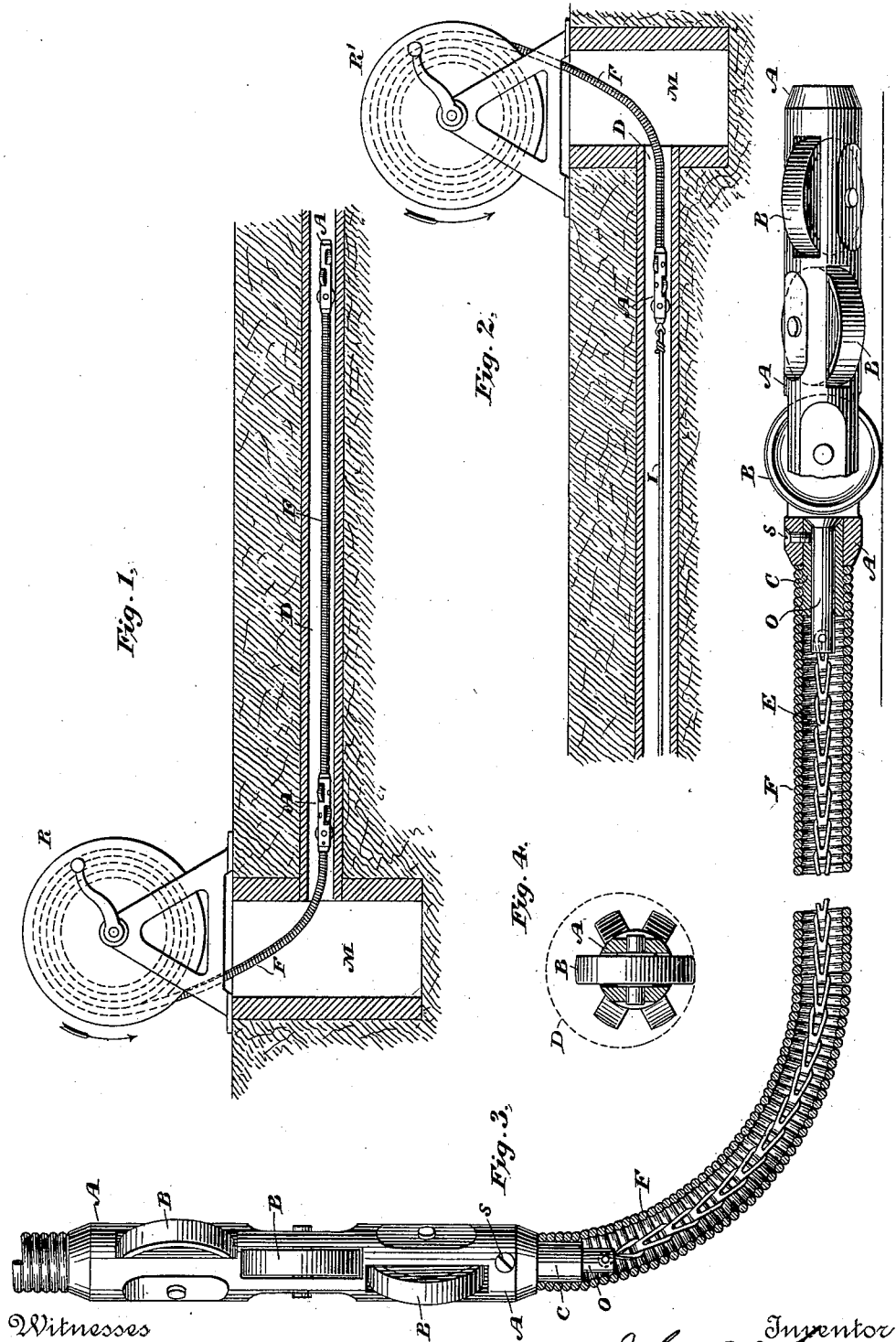
Witnesses
Geo. W. Breck.
Edward Thorpe.
Inventor.
John A. Seely
By his Attorney
Wm. B. Vansize

UNITED STATES PATENT OFFICE.

JOHN A. SEELY, OF BROOKLYN, NEW YORK.

LEADING-IN APPARATUS FOR CONDUITS.

SPECIFICATION forming part of Letters Patent No. 400,958, dated April 9, 1889.

Application filed February 2, 1889. Serial No. 298,509. (No model.)

*To all whom it may concern:*

Be it known that I, JOHN A. SEELY, a citizen of the United States, and a resident of Brooklyn, in the county of Kings and State of New York, have invented certain new and useful Improvements in Leading-In Apparatus for Conduits, of which the following is a specification.

My invention is an improvement in apparatus for introducing electrical conductors or cabled electrical conductors into an inclosed passage—such as an underground conduit—which, as is well known, is not accessible from the surface of the ground, but is only accessible with the greatest difficulty from the openings at either end by an operation hitherto found slow, tedious, and very expensive.

My improved apparatus consists of a series of anti-friction pieces united by a flexible mechanical connection of such a nature as to preserve the distance between the series of anti-friction pieces substantially unchanged, whether the series of pieces so united be propelled by a force or power applied to push or to pull, and whether the course of movement or path be direct or curved, as in passing around corners. An apparatus of this kind having one end introduced into a conduit or underground passage may be continuously pushed along for a great distance—say a hundred feet or more—and this is done very rapidly. The apparatus may be wound upon a reel at one end of the conduit, and upon the appearance of the entering end at the opposite or exit end of the conduit it may be subjected to a pulling-power, again wound upon a reel, and the operation repeated with a second section of conduit of the same length. A rope, a series of cabled conductors, or a single conductor may thus be introduced into a conduit with rapidity and at small expense for labor and power. The improved anti-friction pieces each consists of a series of wheels or rollers fixed in position in suitable bearings in a plane parallel with the plane of movement of translation or of rotation, but at varying angles with respect to each other. I prefer to make the bearing-piece of brass in the form of a cylinder, and to pivot three brass wheels at angles of one hundred and twenty degrees with respect to each other. The said pivots are located on the axis of the cylinder and separated from each other a distance somewhat greater than the diameter of a wheel or roller. I unite a series of these anti-friction pieces by a flexible mechanical connection consisting of a helical steel wire, the several convolutions of which are in close contact with each other. There is thus formed a flexible tubular mechanical connection yielding slightly in the direction of movement. Within this tubular connection I place a chain or equivalent device, the ends of which are connected by swivel-joints to adjacent anti-friction pieces, and serve to limit the extensibility of the said tubular connection.

The accompanying drawings illustrate my invention.

Figure 1 shows the leading-in apparatus coiled upon a reel, the entering end having been introduced into the pipe or conduit and pushed along some distance. Fig. 2 shows the leading-in apparatus, its entering end having arrived at the exit end of the conduit, where it is coiled upon a reel. The opposite end of the device appears with a rope or conductor attached, which is being drawn through. Fig. 3 is a detail view showing two anti-friction devices united by a flexible mechanical connection, the latter being in section. Fig. 4 shows the entering end of the device as it appears approaching the exit-end of the conduit.

Referring to Fig. 3, A is the bearing-piece, composed of a cylindrical casting of brass, on the axial line of which are pivoted three rollers, B. They are in position to rotate in a plane parallel with the plane of movement of translation, their centers or pivots being separated from each other a distance slightly greater than the diameter of a roller. Each roller is in a separate plane with respect to the others, the plane of one forming an angle of about one hundred and twenty degrees with that of either or both the others. A tubular section, C, of the same metal, enters the end of bearing-piece A, and is held in position by a screw, s. A swivel-piece, o, rotates freely in the tubular section C, and forms the terminal of a section of chain, E.

F is a flexible tubular mechanical connection uniting two anti-friction pieces, A B. It consists of a helically-disposed steel wire, the convolutions being in close contact. It is not susceptible of contraction in the direction of its length, and is rigid under a force applied to push it along in its axial line. It is, however, somewhat yielding to a force applied to draw or pull it along. The chain, or a similar device not susceptible of elongation, is therefore placed within it to limit its capacity for extension in this direction.

D is an underground conduit accessible from man-holes M, located at intervals of, say, one hundred feet or less. Assuming this to be their separating distance, I take, say, ten or twelve anti-friction devices like A B, and unite them by flexible mechanical connections like E and F, each about ten feet long, thus forming a continous cylinder of substantially uniform diameter and extended length, having the property of flexibilty without substantial contraction or expansion under the effects of a force applied to push and repel or to pull and draw. This is my improved leading-in device.

Desiring to place insulated electrical conductors in an underground conduit accessible from man-holes, substantially as shown, I take an apparatus or device of the required length wound upon a reel, R. I introduce one end through the man-hole into the conduit and push it along by hand, applying the force at the man-hole until the entering end of the device appears at the exit end of the conduit. I then fasten a rope or the conductors I, to be drawn in, to the end of the leading-in apparatus and pull the apparatus from the exit end, at the same time reeling it up on a reel like R'. This operation having been practiced with the first section of conduit, is repeated with the second and third, and so on. The apparatus facilitates an operation hitherto very difficult, expensive, and dilatory, rendering it comparatively easy, inexpensive, expeditious, and simple.

What I claim, and desire to secure by Letters Patent, is—

1. In a leading-in apparatus for conduits, the combination of two or more anti-friction devices constructed substantially as described, and a flexible mechanical connection uniting said devices, said connection being capable of limited expansion and contraction, whereby the distance between any two such devices is maintained substantially unchanged under the action of a power applied to push or to pull the apparatus through a conduit.

2. In a leading-in apparatus for conduits, the combination of two or more anti-friction devices constructed substantially as described, a flexible mechanical connection uniting said devices capable of limited expansion and contraction, and a supplemental mechanical connection between said devices capable of contraction only, whereby the distance between any two such devices is maintained substantially unchanged under the action of a force applied to push or to pull said apparatus through the conduit.

3. In a leading-in apparatus for conduits, the combination of two or more anti-friction devices composed of wheels or rollers united by a flexible connection composed of a helically-disposed wire or strip, substantially as described.

4. In a leading-in apparatus for conduits, the combination of two or more anti-friction devices united by a flexible mechanical connection consisting of a helically-disposed wire or strip and a chain, substantially as described.

5. In a leading-in apparatus for conduits, two or more anti-friction devices, each composed of a support or bearing-piece and two or more wheels or rolls, the plane of rotation of such wheels or rolls being parallel with the line of movement of translation, but forming an angle with respect to each other, in combination with a mechanical connection uniting said devices, substantially as described.

6. In a leading-in apparatus for conduits, two or more anti-friction devices, each composed of a support or bearing-piece and two or more wheels or rolls, the plane of rotation of each of such wheels or rolls being parallel with the line of movement of translation and forming an angle with respect to each other, in combination with a flexible connection mechanically uniting successive devices, substantially as described.

7. In a leading-in apparatus for conduits, the combination of a cylindrical section or bearing-piece and three wheels or rolls pivoted on the line of its major axis, the bearings being separated from each other a distance slightly greater than the diameter of a wheel or roll, substantially as described.

8. In a leading-in apparatus for conduits, the combination of two or more cylindrical sections or bearing-pieces, wheels or rolls pivoted on the line of their major axes, and a flexible connection uniting successive or adjacent sections, substantially as described.

9. In a leading-in apparatus for conduits, the combination of two or more cylindrical sections of metal, wheels or rolls pivoted on the line of their major axes, and a flexible connection mechanically uniting each pair of sections into one continuous cylinder of extended length, said connection consisting of a helically-disposed resilient wire or strip, substantially as described.

10. In a leading-in apparatus for conduits, the combination of a series of cylindrical sections of metal, wheels or rolls pivoted on the line of their major axes, and flexible connections mechanically uniting successive sections into one continuous cylinder of substantially uniform diameter and extended length, said connections consisting of a helically-disposed resilient wire or strip and a chain terminating in a swivel-joint, substantially as described.

Signed at New York, in the county of New York and State of New York, this 1st day of February, A. D. 1889.

JOHN A. SEELY.

Witnesses:
DANIEL E. DELAVAN,
F. D. L. WALKER.